March 19, 1968  F. L. MOORE  3,373,494
FOOT MEASURING DEVICE
Filed July 15, 1965  2 Sheets-Sheet 1
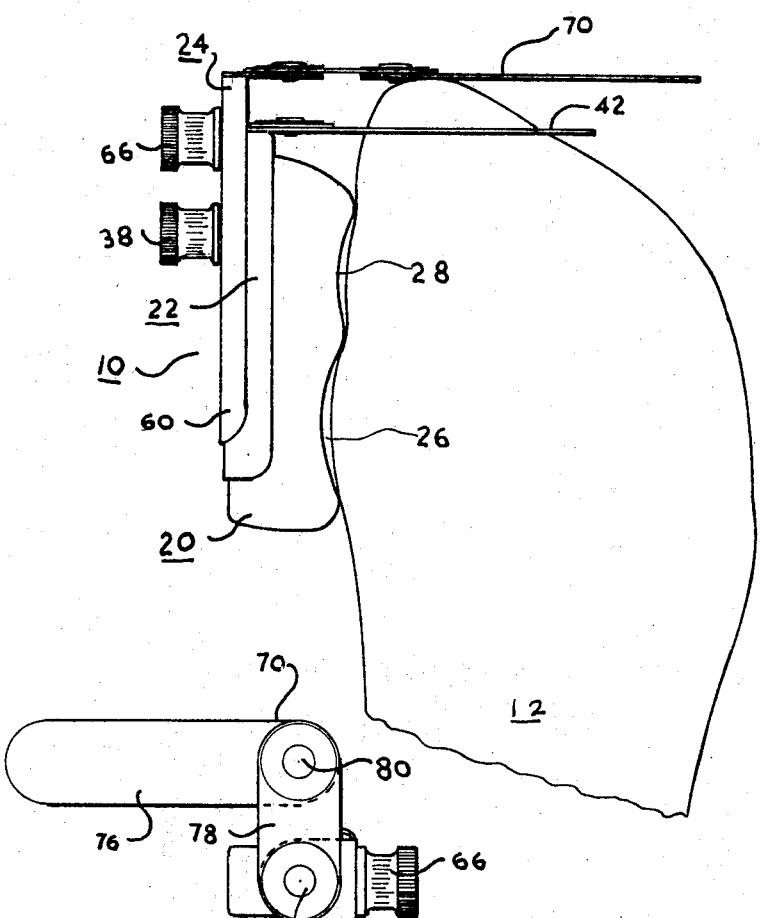
INVENTOR.
FRANCIS L. MOORE
BY
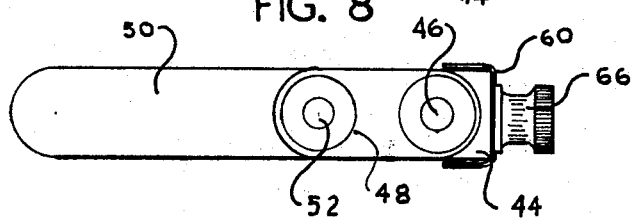
ATTORNEY March 19, 1968     F. L. MOORE     3,373,494

FOOT MEASURING DEVICE

Filed July 15, 1965     2 Sheets-Sheet 2

INVENTOR.
FRANCIS L. MOORE
BY M. A. Hobbs
ATTORNEY

United States Patent Office 3,373,494
Patented Mar. 19, 1968

3,373,494
FOOT MEASURING DEVICE
Francis L. Moore, 115 E. 9th St.,
Rochester, Ind. 46975
Filed July 15, 1965, Ser. No. 472,211
6 Claims. (Cl. 33—3)

ABSTRACT OF THE DISCLOSURE

A device for measuring foot elongation and fitting shoes, having a member for determining the length of the foot when no pressure is thereon and another member for determining the length of the foot when there is pressure thereon. The two members are adjustable so that the measurement can be translated into the shoe size after the shoe has been placed on the foot.

When shoes are fitted, the usual practice is to measure the width and length of one or both of the feet, usually while the customer is seated, take the reading indicated on the device, and select the shoe size accordingly. This practice often results in misfitting one or both of the shoes, in that it does not take into consideration the fact that the foot is of one length when there is no body weight on the foot and of a longer length when the foot is supporting the weight of the body. The conventional foot measuring device does not compensate for the difference in foot length resulting from variation in body weight on the foot nor for differences in foot elongation from one foot to the other or from the feet of one person to another. Further, while some of the prior devices might be used to determine the amount of foot elongation, these devices do not assist in measuring the shoes so that the necessary additional length or shoe size will be selected or provided. It is therefore one of the principal objects of the present invention to provide a device for measuring the elongation of the feet resulting from body weight and for translating the results into proper shoe length or size.

Another object of the invention is to provide a relatively simple device for measuring the foot elongation while the shoe is removed and for indicating whether a selected shoe size is a proper fit after the shoe has been placed on the foot.

Still another object of the invention is to provide a device for measuring the foot elongation which can be easily adjusted to obtain the measurement of the foot with no body weight thereon and thereafter adjusted to obtain the difference in foot length resulting from full body weight thereon, and readily and effectively used to indicate the proper size shoe to compensate for the predetermined foot elongation.

A further object is to provide a device of the aforesaid type which can readily be adjusted to any foot by the use of two thumb screws for obtaining the correct foot elongation measurement and for maintaining the adjustment or setting, determining and obtaining the proper shoe size and which can easily be used by either the shoe clerk or the customer to determine both the foot elongation and the proper shoe size.

Additional objects and advantages of the present invention will become apparent from the following description and accompanying drawings, wherein:

FIGURE 1 is a top plan view of the present foot measuring device showing the manner in which it is used to determine the elongation of the foot;

FIGURE 4 is a cross sectional view of the device, the section being taken on line 4—4 of FIGURE 2;

FIGURE 8 is an end elevational view of the device as used in determining shoe size as illustrated in FIGURE 7.

Figure 7:
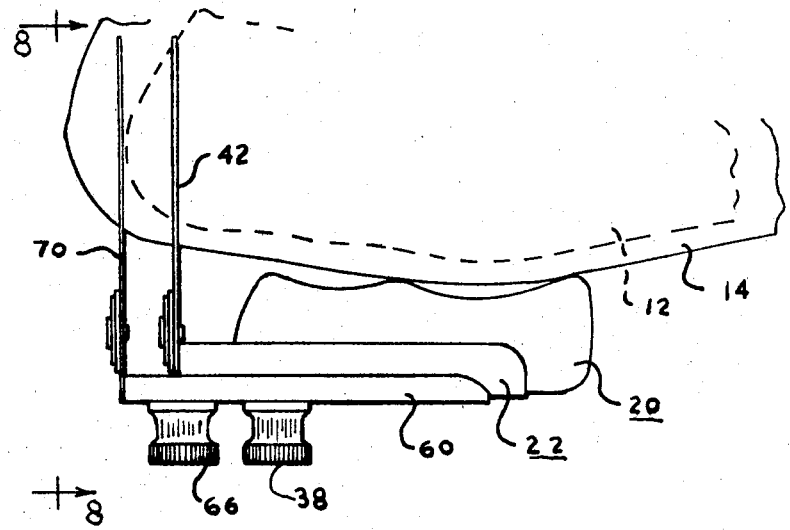
FIGURE 7 is a top plan view showing the manner in which the present device is used to determine the proper size shoe.
Figure 2:
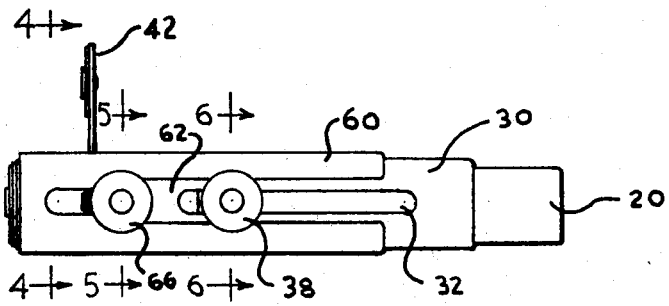
FIGURE 2 is a side elevational view of the present device.

Referring more specifically to the drawings, numeral 10 designates generally the present device, numeral 12 an outline of a foot on which a measurement for elongation is being made and 14 an outline of a shoe on which the determination of elongation found by the method illustrated in FIGURES 1 and 7 is used to determine the proper shoe length or size. The device can be satisfactorily used to determine the foot elongation and proper shoe size for adults and children alike, as will be more fully explained hereinafter.

Figure 3:
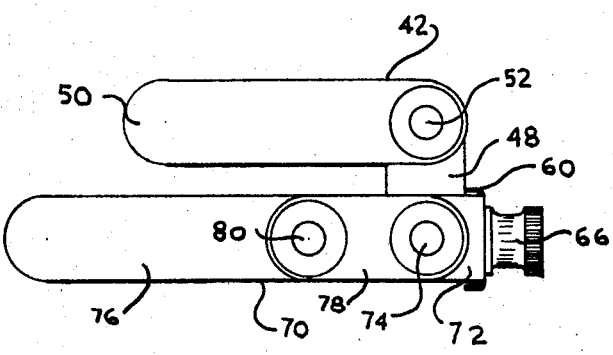
FIGURE 3 is an end elevational view of the present device.
Figure 5:
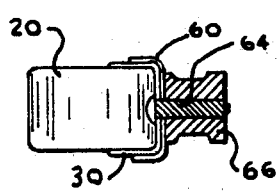
FIGURE 5 is a cross sectional view of the device taken on line 5—5 of FIGURE 2.
Figure 6:
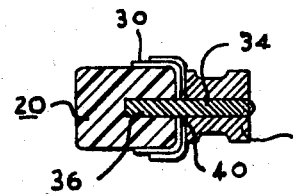
FIGURE 6 is a cross sectional view of the device taken on line 6—6 of FIGURE 2.

The device consists essentially of three basic parts indicated by numerals 20, 22 and 24. Numeral 20 is a base having arcuate recesses or indentations 26 and 28 for seating on the ball of the foot, recess 26 being for adults and recess 28 for children. Part 22 is mounted on base 20 and is adapted to slip longitudinally thereon to measure the forward position of the big or longest toe when the body weight is not on the foot, this part consisting of a channel member 30 having a longitudinal slot 32, a pin 34 seated in a hole 36 in base 20 and having a threaded end for receiving a nut 38. The nut is provided with an extension 40 for seating on the external surface of member 30 along each side of slot 32. The nut is knurled at its outer periphery to provide a good thumb and finger gripping surface. When nut 38 has been loosened, channel member 30 can slide along base 20 for substantially the full length of slot 32. An arm 42 is secured to member 30 by a laterally extending portion 44 and a rivet 46 which permits the arm to pivot from a horizontal position to a substantially vertical position. The arm consists of two sections 48 and 50 pivotally connected to one another by a rivet 52 so that the sections may be placed angularly with respect to one another as illustrated in FIGURE 3.

Slidably mounted on the external surface of member 30 is a channel member 60 having a longitudinal slot 62 extending substantially the full length thereof. The member 60 is held in various adjustable positions by a threaded pin 64 secured at its inner end to member 30 and having screw threads on its outer end for receiving a nut 66, which when tightened, seats on the external surface of member 60, clamping said member in a fixed position against the external surface of member 30. The outer periphery of nut 66 is knurled to provide an effective gripping surface.

Mounted on the outer end of member 60 is an arm 70 pivotally secured to member 60 by a laterally extending portion 72 and a rivet 74 extending through arm 70 and portion 72 so that the arm can pivot from a horizontal position to a vertical position. Arm 70, like arm 42, is constructed of two sections 76 and 78 pivotally connected to one another by a rivet 80 so taht section 76 can be positioned angularly with respect to section 78 in the same manner as the two sections of arm 42. Both arms 42 and 70 are constructed of flat, relatively thin and stiff metal; however, they may be constructed of plastic or any other suitable material.

In the operation of the present device for measuring foot elongation, the shoe is first removed and if an adult is to be fitted with shoes, the recess 26 of base 20 is placed along the side of the foot at the ball next to the big toe. While the weight is removed from the foot, the arm 42 with sections parallel to one another is placed in horizontal position in front of the big or longest toe, sliding member 30 longitudinally on base 20 while nut 38 is loosened. When arm 42 has been placed in proper position, nut 38 is tightened, thus locking member 30 in fixed position. Arm 42 is then raised above the foot, preferably with the two sections positioned as shown in FIGURE 3 with section 50 in horizontal position. Nut 66 is then loosened to permit member 60 to slide longitudinally on the external surface of member 30, and the customer then stands, placing his entire weight on the foot, thus producing the fullest elongation. While the foot is supporting the weight, member 60 with arm 70 in horizontal position as shown in FIGURE 3, is moved so that arm 70 contacts the end of the big or longest toe. While the arm is held in this position, nut 66 is tightened to lock member 60 in fixed position with respect to member 30. The customer then tries on a shoe of the approximate size and the present device is placed along the inner side of the shoe with recess 26 over the ball of the foot, the two arms 42 and 70 being bent that sections 48 and 78, respectively, are vertical and sections 50 and 76 are in horizontal position. Section 76 indicates on the shoe the position of the forward end of the big or longest toe when the full weight of the customer's body is on the foot so that it can readily be determined whether the shoe is sufficiently long to accommodate the foot while the customer is walking or standing.

The same procedure is followed in determining the foot elongation and correct size of the shoe with a child, with the exception that recess 28 is placed along the ball of the foot rather than recess 26. Either slot can be used provided the arms can be adjusted to proper position at the forward end of the big or longest toe; however, whichever recess is used for adjusting the device with the shoe off must be used in determining the length of the shoe when the shoe is on the foot.

While only one embodiment of the present invention has been described in detail herein, various changes and modifications may be made without departing from the scope of the invention.

I claim:

1. A device for measuring foot elongation and fitting shoes therefrom, comprising a base having a plurality of recesses spaced therealong for receiving the ball of the foot while the shoe is both off and on, a first channel shaped member with an elongated slot therein mounted on said base for longitudinal movement lengthwise of said foot, a pin secured to said base and extending through said slot and having a threaded outer end, a nut threaded onto said pin and having a reduced inner end portion for seating on said member and holding said member in fixed position with respect to said base, a first arm extending transversely from and pivoted to the forward end of said first member and having two sections pivotally connected to one another on an axis parallel with said slot, a second channel shaped member with an elongated slot therein mounted on said first member in parallel relation thereto for movement longitudinally thereon, a pin secured to said first member near the forward end thereof and having a threaded outer end extending through the slot in said second member, a nut threaded onto said second pin for seating on said second member and clamping said members together, and a second arm parallel to said first arm pivoted to the forward end of said second member and having two sections pivotally connected to one another.

2. A device for measuring foot elongation, comprising a base having means for locating the base with respect to the ball of the foot while the shoe is both off and on, a first member with an elongated slot therein mounted on said base for longitudinal movement lengthwise of siad foot, a pin secured to said base and extending through said slot and having a threaded outer end, a nut threaded onto said pin and having a reduced inner end portion for seating on said member and holding said member in fixed position with respect to said base, a first arm extending transversely from and pivoted to the forward end of said first member and having two sections pivotally connected to one another on an axis parallel with said slot, a second member with an elongated slot therein mounted on said first member in parallel relation thereto for movement longitudinally thereon, a pin secured to said first member near the forward end thereof and having a threaded outer end extending through the slot in said second member, a nut threaded onto said second pin for seating on said second member and clamping said members together, and a second arm parallel to said first arm pivoted to the forward end of said second member and having two sections pivotally connected to one another.

3. A device for measuring foot elongation, comprising a base having a plurality of recesses spaced therealong for receiving the ball of the foot while the shoe is both off and on, a first channel shaped member with an elongated slot therein mounted on said base for longitudinal movement lengthwise of said foot, a means for releasably retaining said member in adjusted positions, a first arm extending transversely from and pivoted to the forward end of said first member and having two sections pivotally connected to one another on an axis parallel with said slot a second channel shaped member with an elongated slot therein mounted on said first member in parallel relation thereto for movement longitudinally thereon, a means for releasably retaining said second member in adjusted position with respect to said base, and a second arm parallel to said first arm pivoted to the forward end of said second member and having two sections pivotally connected to one another.

4. A device for measuring foot elongation, comprising a base having means for locating the base with respect to the ball of the foot, a first member with an elongated slot therein mounted on said base for longitudinal movement lengthwise of said foot, a means for releasably retaining said member in adjusted positions, a first arm extending transversely from and pivoted to the forward end of said first member and having two sections pivotally connected to one another on an axis parallel with said slot, a second member with an elongated slot therein mounted on said first member in parallel relation thereto for movement longitudinally thereon, a means for releasably retaining said second member in adjusted position with respect to said base, a second arm parallel to said first arm and pivoted to the forward end of said second member and having two sections pivotally connected to one another.

5. A device for measuring foot elongation and fitting shoes therefrom, comprising a base having means for locating the base with respect to the ball of the foot, a first member with an elongated slot therein mounted on said base for longitudinal movement lengthwise of said foot, a means for releasably retaining said member in adjusted positions, a first arm extending transversely from and pivoted to the forward end of said member and having two sections pivotally connected to one another on an axis parallel with said slot, a second member with an elongated slot therein mounted on said first member in parallel relation thereto for movement longitudinally thereon, a means for releasably retaining said second member in adjusted position with respect to said base, and a second arm parallel to said first arm pivoted to the forward end of said second member and having two sections pivotally connected to one another.

6. A device for measuring foot elongation and fitting shoes therefrom, comprising a base having means for locating the base with respect to the ball of the foot, a first member mounted on said base for longitudinal movement lengthwise of said foot, a means for releasably retaining said member in adjusted positions, a first arm extending transversely from and pivoted to the forward end of said first member and having two sections pivotally connected to one another on an axis parallel with said slot, a second member mounted on said first member in parallel relation thereto for movement longitudinally thereof, a means for for releasably retaining said second member in adjusted position with respect to said base, and a second arm parallel to said first arm pivoted to the forward end of said second member.

References Cited

UNITED STATES PATENTS

| | | | |
|---|---|---|---|
| 648,576 | 5/1900 | Taylor | 33—161 |
| 2,270,355 | 1/1942 | Swanson | 33—161 |
| 2,527,168 | 10/1950 | Wehler | 33—3.2 X |
| 2,778,112 | 1/1957 | Van Buren | 33—3.2 |
| 3,120,057 | 2/1964 | Ludwig | 33—3.2 |
| 3,205,578 | 9/1965 | Bartkowski | 33—3.2 |

LEONARD FORMAN, *Primary Examiner.*

L. ANDERSON, *Assistant Examiner.*